United States Patent [19]

Gomolak et al.

[11] Patent Number: 5,287,610
[45] Date of Patent: Feb. 22, 1994

[54] SEAT ASSEMBLY WORK STATION AND METHOD OF OPERATION OF SAME

[75] Inventors: Frederick Gomolak, Cadillac; George Altman, Boon; Tim Swinehart, Lake City, all of Mich.

[73] Assignee: Mitchell Corporation of Owosso, Owosso, Mich.

[21] Appl. No.: 974,612

[22] Filed: Dec. 28, 1992

[51] Int. Cl.5 ............... B68G 7/00; B68G 15/00
[52] U.S. Cl. ................. 29/91.1; 29/91.5; 29/91.8; 29/281.1; 29/448
[58] Field of Search ........... 29/9.1, 91.1, 91.3, 29/91.5, 91.7, 91.8, 281.1, 281.3, 281.4, 446, 448, 449; 100/238

[56] References Cited

U.S. PATENT DOCUMENTS

| | | | |
|---|---|---|---|
| 1,801,029 | 4/1931 | Vandervoort | 29/91.7 |
| 3,029,550 | 4/1962 | Carolan | 29/91.5 |
| 3,438,108 | 4/1969 | Nash | 29/91.5 |
| 4,385,427 | 5/1983 | Fraiser | 29/91.5 |
| 4,939,832 | 7/1990 | Satuka et al. | 29/281.4 |
| 4,942,651 | 7/1990 | Miyamoto | 29/91.5 |

FOREIGN PATENT DOCUMENTS

| | | | |
|---|---|---|---|
| 3009422 | 9/1981 | Fed. Rep. of Germany | 29/91.7 |
| 0228798 | 10/1985 | Fed. Rep. of Germany | 29/91.5 |

Primary Examiner—Mark Rosenbaum
Assistant Examiner—S. Thomas Hughes
Attorney, Agent, or Firm—Krass & Young

[57] ABSTRACT

A work station for assisting a worker in applying the trim components to a partially assembled seating unit consisting of a seat frame and both seat and backrest cushions. The work station comprises a pedestal for receiving and supporting the seating unit in an inverted position. A vertical compressor is operable to compress the seat bottom cushion while, at the same time, permitting rotation of the compressor and the pedestal about a common vertical axis. This facilitates final installation of the seat bottom cushion trim. In addition, a second essentially horizontal compressor and a pair of manually operable seat back rest trim cover stretchers are provided for assisting the worker in the final assembly of the seat back rest trim to the seating unit. All power assist mechanisms are preferably pneumatically operated.

15 Claims, 5 Drawing Sheets

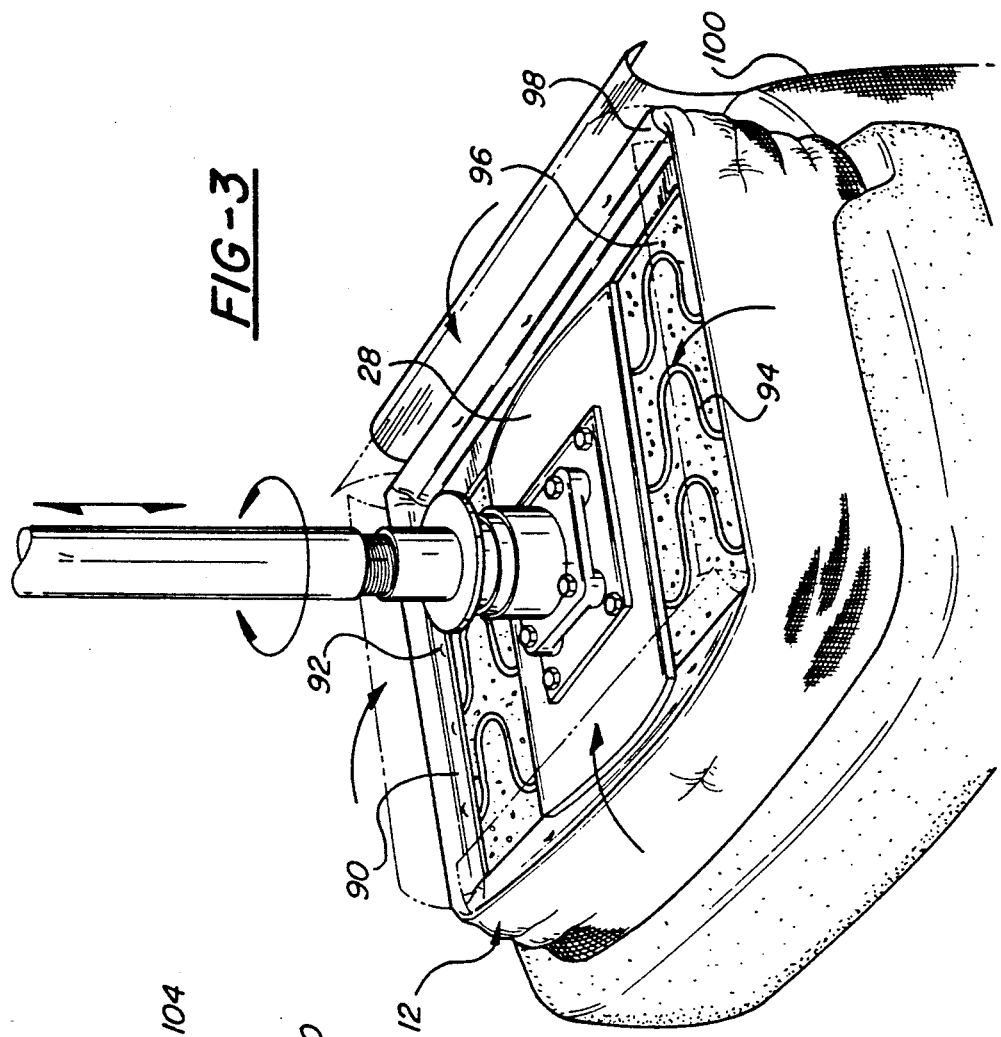
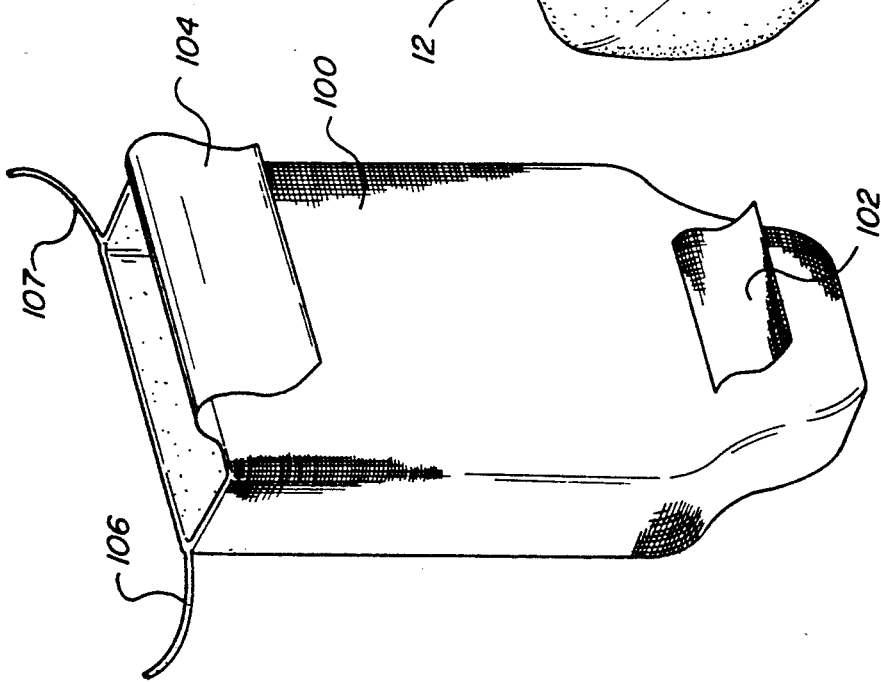

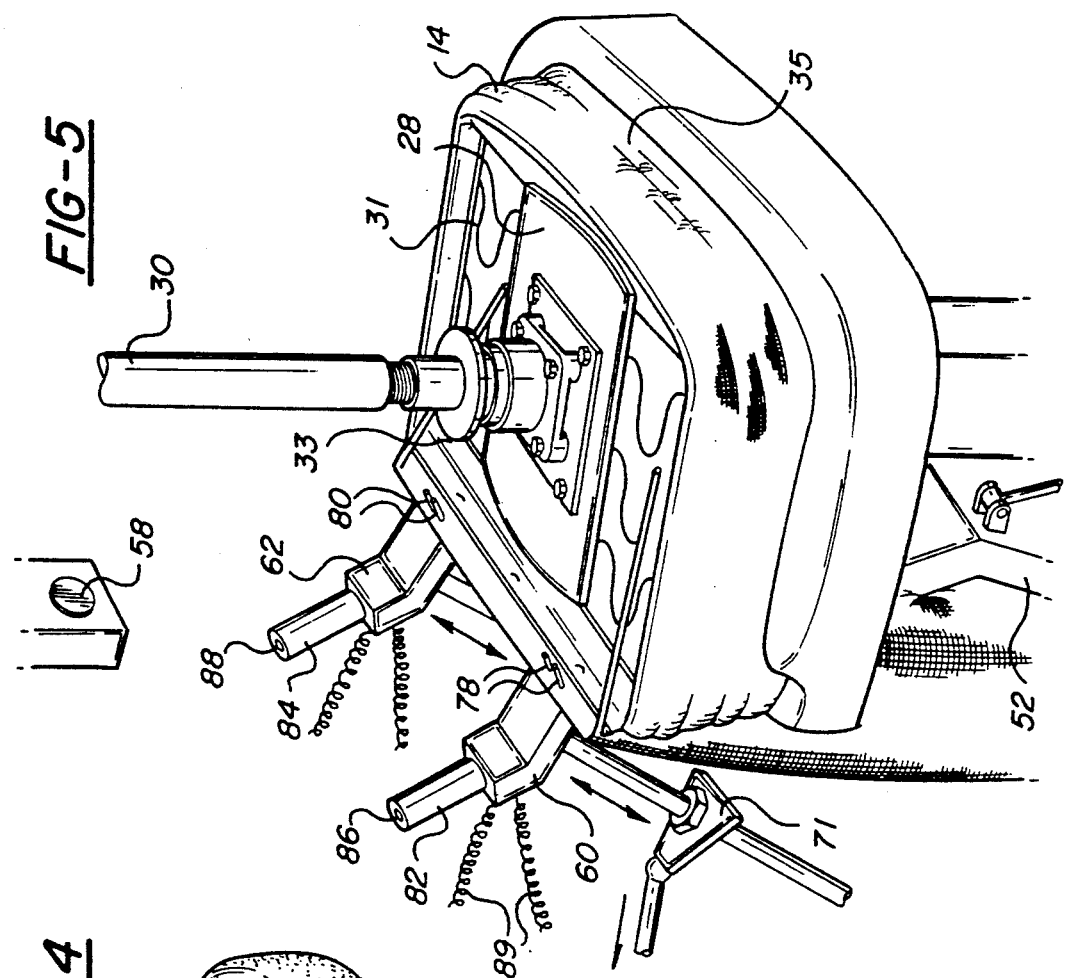
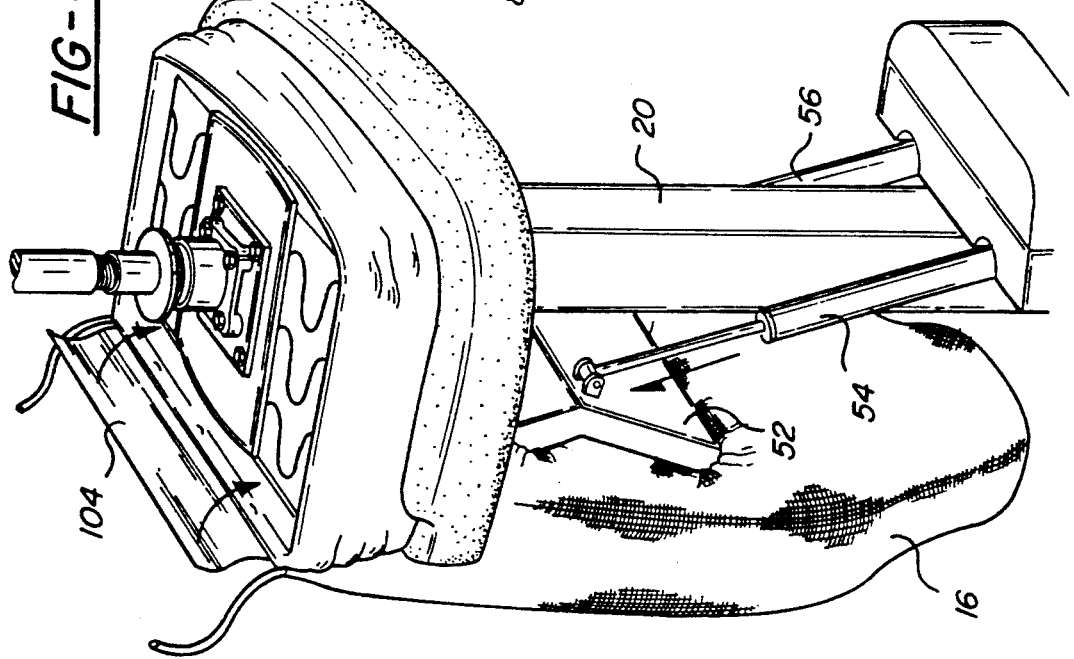

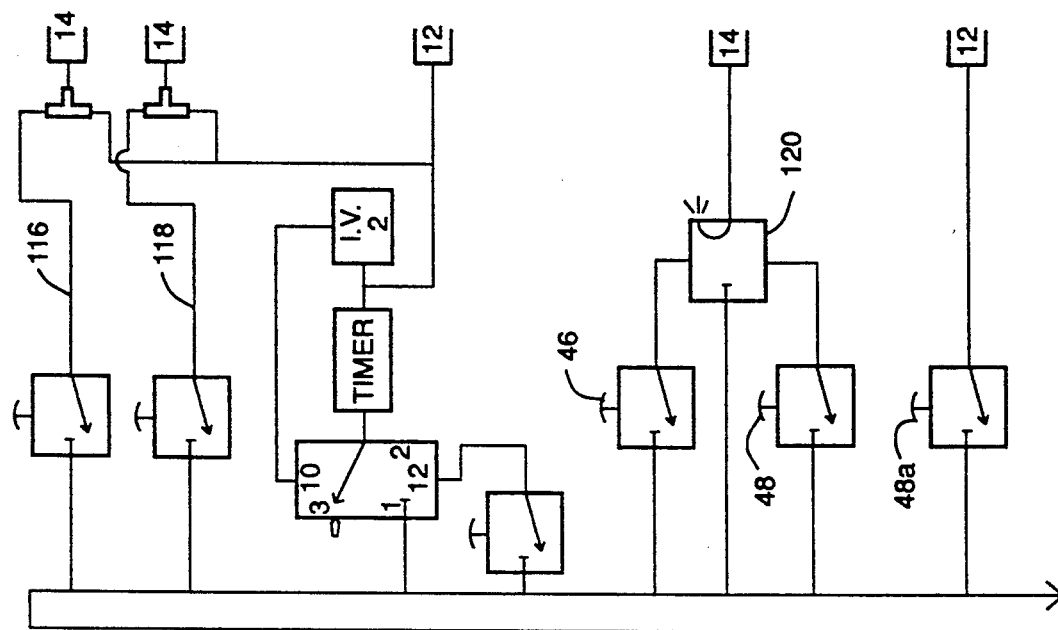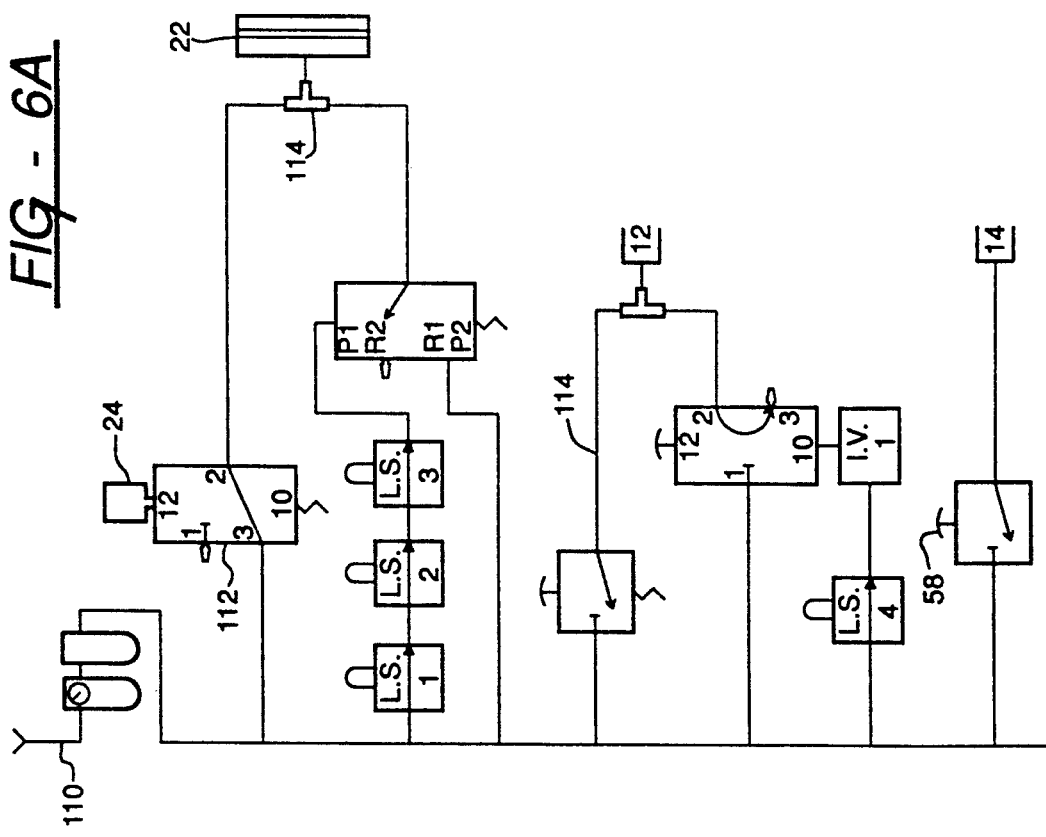
FIG - 6A

SEAT ASSEMBLY WORK STATION AND METHOD OF OPERATION OF SAME

This invention relates to the manufacture of seating structures of the type comprising compliant foam seat back and seat cushion bodies disposed on a frame and covered with trim components. More specifically, the invention is a work station having power assist means for effectively reducing the physical work load of the worker whose job it is to fit and secure trim components to a cushion and frame assembly.

BACKGROUND OF THE INVENTION

The mass production of vehicle seating units is commonly carried out by welding together the bottom and back rest portions of a seat frame, mounting contoured foam cushions, typically open cell plastic, on the frame and thereafter fitting trim components to the cushions. Such trim components may, in the illustrative case of a single occupant bucket seat, involve a bag-like seat back cover and a seat cushion cover. Both may be fabricated of vinyl, leather, woven fabric, synthetic fabric, or a combination. The application of the trim components unifies the seating unit by securing the foam cushions to the seat frame. Such cushions may also be partly or fully secured to the seal frame by other means such as the use of adhesives.

The step of securing the trim components to the seal frame is often a strenuous one for the assembly worker. To produce an attractive, well-made seat the trim must be stretched taut over the cushions and held in place while hog rings or staples are applied with the use of an automatic, commercially-available gun. This operation is usually performed with the seat in an inverted position. The seat must be reoriented several times during the operation. These operations, while manageable, are repetitive and can result in worker fatigue and physiological ailments associated with repetitive stress to the muscles, tendons and ligaments of the arms and hands. A machine which partially assists in the application of a seat back cover to a preassembled seat frame/back cushion assembly is disclosed in U.S. Pat. No. 4,385,427 "Machine for Installing Upholstery Covers," issued May 31, 1983 to Frederick F. Fraiser. The disclosure of that patent is incorporated herein by reference.

SUMMARY OF THE INVENTION

Overall the subject invention provides powerassisted mechanisms conveniently arranged into a work station for use by a worker in the final assembly of seating trim components to a preassembled seat frame/cushion combination.

According to a first specific aspect of the invention means are provided for receiving and supporting the partially trimmed seat assembly in an inverted position such that the open seat frame bottom is accessible by the worker at the work station. Such means comprise a pedestal which receives the seating unit and is selectively rotatable about a vertical axis so that the worker can confront the pedestal and the partly assembled seating unit in several orientations; i.e., front, back and sides. The invention further comprises a vertical compressor which is mounted above the pedestal and on a common axis therewith. The vertical compressor is selectively operable for compressing the seat cushion portion of the partly assembled seating unit and at the same time securing the seating unit to the pedestal. Control means are preferably provided for activating and deactivating the vertical compressor in a safe way; i.e., in a way which ensures that no part of the worker's body lies in the path of the descending compressor as it is activated. Through the use of this apparatus, the task of securing the seat bottom trim component to the seat frame is facilitated while the physical stress to the worker is reduced.

According to a second aspect of the invention, means are provided in the work station, in combination with a pedestal for receiving the partly assembled seating unit in an inverted position, for selectively compressing at least a portion of the seat back rest cushion to facilitate securement of the bottom of the seat back trim component to the seat frame. In the preferred form this mechanism comprises a horizontal compressor and one or more air cylinders operable in such a fashion as to extend the compressor against the exterior face of the seat back cushion trim to compress the lower portion of the seat back cushion. Through the use of this mechanism, the securement of the seat back trim to the frame is facilitated while reducing physical stress to the worker.

In accordance with a third aspect of the invention, means are provided for controllably stretching the seat back cover toward the seat bottom and holding the seat back in a taut and stretched condition while the worker finally secures appropriate components of the seat back trim cover to the seat frame. Suitable control means are provided for selectively and deftly activating the stretcher components and guiding them into operative association with the seat back trim cover. Used in combination with a rotatable pedestal for receiving the seating unit in an inverted position, the final securement of the seat back trim to the seat frame is facilitated while reducing physical stress to the worker.

In the preferred form the seat back stretcher means comprises a pair of independently operable air cylinders and manually operable control handles which are utilized to guide hooks in a stretcher fixture into apertures which are preformed in the seat back trim cover. In the preferred form the handles are provided with hand grips and control apertures which are handily covered with and by the worker's thumbs to activate control circuitry which causes the stretcher cylinders to extend.

According to a fourth aspect of the invention, a method of assisting a worker in the application of trim components to partly preassembled seating units is provided. This method comprises the steps of suitably securing a partly assembled seating unit on a pedestal in an inverted orientation, securing the seat to the pedestal, reorienting the partly assembled seating unit as necessary and thereafter selectively compressing one or both of the seat bottom and back rest cushions and/or stretching trim components to provide a tight and wrinkle-free association of the trim components with the seating unit, and securing the trim components to the seat frame with the assistance of conventional staple and/or hog ring guns or other suitable means.

A fuller appreciation of the invention and the various aspects thereof briefly summarized above may be had by reference to the following specification which describes a specific embodiment of the invention as applied to a specific but illustrative seating unit in substantial detail.

BRIEF DESCRIPTION OF THE DRAWINGS

FIG. 2 is a perspective view of a seat back cover in an inverted orientation and suitable for application to a single occupant bucket seat of the type comprising independent seat bottom and back rest cushions applied to and carried by a rigid seat frame;

FIG. 3 is a perspective view of a single occupant bucket seat in the work station of FIG. 1 after application of a vertical seat bottom compressor;

FIG. 4 is a perspective view of a single occupant bucket seat in the work station of FIG. 1 and specifically illustrating the application of the seat back rest or horizontal compressor;

FIG. 5 is a perspective view of a single occupant bucket seat in the work station of FIG. 1 illustrating application of the seat back cover stretching mechanism; and FIGS. 6a and 6b are diagrams of the pneumatic and electronic control circuitry associated with the work station of FIG. 1.

DETAILED DESCRIPTION OF THE SPECIFIC EMBODIMENT

Figure 1:
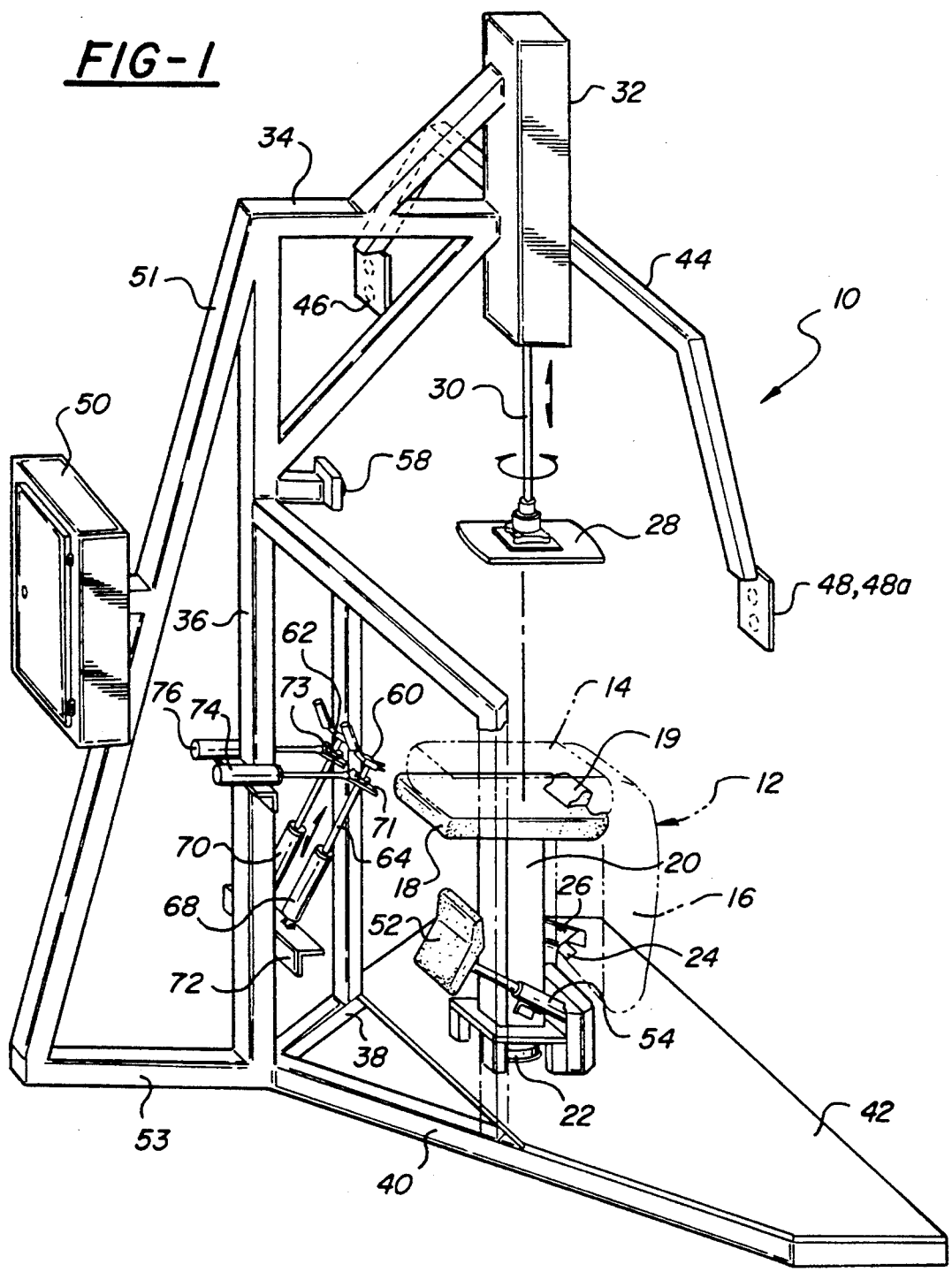
FIG. 1 is a perspective view of a work station constructed in accordance with the invention and the various aspects thereof.

The invention and the various aspects thereof will be described with reference to the assembly of separate seat cushion and back rest trim components, in this instance constructed of vinyl material, to a singleoccupant bucket seat of the type typically found in an automotive vehicle. Moreover, the work station of the subject invention and the procedural method steps which are performed thereby will be described with reference to operations on a seating unit having a separate, rigid metal frame which is constructed according to known methods; e.g., the seat bottom frame is formed by welding together metal components to form a box-like perimeter and two or more bottom plates spanning the perimeter. Loops are formed in the perimeter by stamping to receive hog rings and sinusoidal "No-sag" springs, or the like. A U-shaped seat backrest frame of tubular material is welded to the seat bottom frame. Thereafter, separate foam plastic or rubber backrest and seat bottom cushions are placed on the frame. The seat bottom cushion may simply sit on the seat bottom frame awaiting unification to the seat frame by application of the seat bottom trim component through procedures hereinafter described. The back cushion may, for example, comprise two complemental foam pieces which together fully enclose the inverted U-shaped seat backrest tubular frame and which are secured together by means of adhesive at the outside mating edges thereof. For appearance purposes, one or more horizontal slots may be formed in the seat backrest cushions to provide a fitted look to the final product. A slot exists between the independent seat backrest cushion and seat bottom cushion through which trim elements hereinafter described can extend.

Finally, it is to be understood that the seat backrest trim cover is partly applied to the seating unit before it reaches the work station of the subject invention; i.e., it is placed over the backrest cushion but not stretched or secured at its lower end. This is preferably achieved by means of a machine essentially as described in U.S. Pat. No. 4,385,427. It is to be understood, however, that the reference to this U.S. patent is not intended by way of limitation, but by way of example as the seat back cushion may also be manually applied to the partly assembled seating unit or applied by means of some other type of machinery.

Referring to the drawing, a seat assembly work station 10 is adapted to receive a seating unit 12 which comprises a bottom unit 14 and a backrest unit 16. The work station 10 comprises a padded pedestal 18 of approximately 30 inches in height and which confronts a worker (not shown) in the work station. Pedestal 18 is mounted on a vertical support 20 manually initiated rotation about a vertical axis A. The manual rotation of the inverted seating unit 12 on the padded pedestal 18 is selectively arrested or enabled by means of a clutch 22 which is normally locked to prevent rotation of the pedestal about the vertical axis A but which may be released selectively by operation of a foot treadle 24 mounted in a shielded housing 26 for operation by the worker's right foot when he is in the work station facing the inverted seating unit 12 on the pedestal 18.

The work station 10 further comprises a vertical compressor plate 28 which is mounted on the lower end of a shaft 30 which is disposed on the vertical axis A which extends through the pedestal 18,20. The shaft 30 and plate 28 is extended and retracted by means of a two-way air cylinder 32 mounted slightly above and ahead of the worker when confronting the inverted seating unit 12 on the pedestal 18 in the work station 10. The air cylinder 32 is permanently and rigidly secured to a tubular steel frame 34 having a main vertical member 36 and outwardly diverging horizontal base members 38 and 40 which support a platform 42 upon which the worker stands when utilizing the work station 10.

Activation of the vertical compressor cylinder 32 to lower the plate 28 against the bottom side of the inverted seating unit 12 in the fashion represented by FIGS. 3, 4 and 5 is achieved by way of push button units and 48 which are mounted on the left and right opposite ends of a handlebar frame 44 rigidly secured to the housing of the air cylinder 32. The size, shape and orientation of the handlebar frame 44 is such that the push button units and 48 can be reached by the outstretched arms of a worker standing on the platform 42 and confronting the inverted seating unit while standing essentially upright. The safety circuitry associated with the activation system is such that both left and right push buttons 46 and 48 must be activated in the proper sequence and held. This ensures that the worker can cause the vertical compressor plate to descend against the seat bottom cushion only when he (a) is standing upright, (b) is facing the work station, and (c) has both hands free to operate the push buttons 46,48 in the appropriate sequence.

Summarizing, work station 10 is configured to receive and rotatably support a partially assembled single occupant automotive seating unit 12 in such a fashion as to rest on the padded pedestal 18 with the back rest portion 16 depending downwardly. A small bolster 19 formed on the pedestal 18 extends upwardly and rearwardly into the slot between the seat cushion 14 and the backrest cushion 16 to assist in locating and securing the partially assembled seating unit 12 on the pedestal 18. Thereafter, the upright worker reaches out his left and right hands to the push buttons 48 and 46, respectively, and operates them in the appropriate sequence to cause the descent of the vertical compressor plate 28 through operation of the air cylinder 32. The compressor plate 28, as best shown in FIGS. 3, 4 and 5, engages the springs 31 and the perimeter rails 33 of the seat bottom frame. The downward travel of the air cylinder shaft 30 is such as to substantially compress the foam cushion within the seat bottom assembly 14 so as to substantially facilitate the step of securing the peripheral edges of the vinyl seat cushion covers 35 to the seat frame by means of a conventional hog ring gun (not shown). The plate 28 is freely rotatable about axis A whether extended or retracted. When extended, plate 28 holds the seating unit 12 on pedestal 18 but permits rotation thereof as hereinafter described.

Continuing with the description of the work station 10, a control box 50 for the control circuitry associated with push buttons 46,48 is fixed to an angled vertical rail 51 which forms an integral part of the work station support frame and is joined by a floor rail 53 to the A-frame rails 38 and 40. Control box 50 provides electronic and pneumatic circuitry for responding to the operation of the push buttons 46 and 48 and additional components hereinafter described. The box 50 is provided with a key-lockable door and provides convenient access to control circuit components for service and repair.

A second device which assists the assembly worker in the final trimming of the seating unit 12 includes a horizontal compressor 52 pivotally mounted on the ends of air cylinder extension arms 54 and 56 which straddle the pedestal 20 as best illustrated in FIG. 4. When activated by a push button 48a, the parallel air cylinders 54 and 56 operate to extend the padded press upwardly and rearwardly against the front exterior surface of the back rest 16 to compress the lower portion of the foam cushion within the back rest portion 16, thereby to assist the operator in finalizing the securement of backrest cover 100 to the seat frame.

With reference to FIG. 2, the arrangement of the seat back rest cover 100 is shown. The cover 100 is made up of sewn-together vinyl panels and includes a flap or listing 102 which extends into the aforementioned horizontal slot in the seat back and is hog-reiged or startled in place to provide a fitted look. As has also been previously described, the vinyl back rest sleeve 100 is installed over the foam seat back cushion by means of a machine such as that disclosed in U.S. Pat. No. 4,385,427. A fabric flap or listing 104 extends from the bottom front surface of the seat back cover 100 and is directed through the slot between the seat back and cushion portions to the position shown in FIGS. 4 and 5 where it is wrapped around the seat frame and secured to the inside bottom of the seat frame with the assistance of the back rest cushion press 52. The press 52 assures a taut wrinkle-free condition of the seat back cover when finally installed. Finally, the seat back cover 100 includes vinyl tails 106,107 which extend from the back bottom corners of the cover. These tails are also secured by hog rings to the metal elements of the seat frame with the assistance of the devices illustrated in FIGS. 1 and 5 and immediately hereinafter described in detail.

Pivotally mounted to a cross rail 72 which is welded to the vertical support member 36 are a pair of independently-operable air cylinders 68 and 70 having extension rods 64 and 66, the ends of which carry seat back rest cover stretchers 60 and 62. As best shown in FIG. 5, the back rest stretchers 60 and 62 extend upwardly and toward the pedestal 18 from the mounting rail 72 to which the cylinders 68 and 70 are pivotally attached. Position control is also effected by means of retract cylinders 74 and 76 which are secured to the upright support member 36 and have extensible members extending forwardly to brackets 71,73 through which the extension rods 64 and 66 extend. The stretcher devices 60 and 62 are equipped with upwardly and forwardly extending pins 78 and 80, respectively, which are insertable by the operator through corresponding holes formed in the reinforced back hem of the seat back cover 100.

Stretchers 60 and 62 are equipped with hollow aluminum handles 82 and 84 having control apertures 86 and 88, respectively, which are used to activate the extension cylinders 68 and 70 to urge the stretchers 60 and 62 upwardly under independent control of the operator. Activation is effected by having the operator place his thumb over the holes or apertures 86 and 88. A resulting change in air pressure in control lines 89 is sensed by means hereinafter described to activate the air cylinder circuits to extend the stretchers upwardly. The operator can extend the stretchers incrementally by placing his thumb over the selected air hole for an instant, removing his thumb and then replacing it as desired to effect first the engagement of the hooks 78 and 80 in the apertures and then to further extend the air cylinders to stretch and pull the seat back cover 100 upwardly. After such an operation has been achieved, the tails 106 are folded back on one another as desired and secured by hog rings to the springs 31 or to other rigid metal elements on the interior of the seat frame. The stretchers 60,62 are automatically retracted by pressing push button 58. This essentially completes the assembly of the two vinyl seat cover components; i.e., bottom cushion and back rest cushion to the seating unit.

OPERATION

The sequence of method steps which are utilized to assemble a specific type of single occupant, vinylcovered bucket style seating unit 12 will now be described:

1) the foam cushions are placed on the seat frame as previously described;

2) the back rest cover 100 is placed on and over the back rest cushion by means of a machine of the type disclosed in U.S. Pat. No. 4,385,427 or some other machine or manually as desired;

3) the bottom or seat cushion cover 35 is fitted over the seat cushion and the rear lifting is pushed through the slot between the backrest cushion and the seat bottom cushion;

4) the partly assembled seating unit 12 is placed on the pedestal 18 with the backrest portion 16 extending downwardly and nearest the operator;

5) a listing on the seat bottom cover 35 is rolled or wrapped around the rear seat frame perimeter bar and stapled in place;

6) the push buttons 46 and 48 are activated in sequence to cause the vertical compressor plate 28 to descend, thereby compressing the seat bottom cushion and firmly holding the partly assembled seating unit 12 to the pedestal 18;

7) the clutch 22 is released, the seat pedestal 18 is rotated freely as desired and seat cushion cover sides are folded and secured by hog rings to the seat frame;

8) the front edge of the seat cushion cover 35 is folded in and secured by hog rings to the seat frame; this operation is expedited by depressing the treadle 24 to release the clutch 22 to permit the pedestal plate 18 and the ram plate 28 to rotate about the vertical axis A as desired;

9) the clutch 22 is again operated and the seat is rotated 180 degrees about the axis A such that the backrest portion 16 is farthest from the operator 10;

10) push button 46a is activated to extend the back cushion compressor 52 to compress the lower seat backrest cushion;

11) the seat back listing 104 is wrapped around the interior of the seat frame over the bottom cushion listing and secured in place by means of hog rings;

12) the back rest cover stretchers 60 and 62 are brought forwardly and upwardly by the operator to engage the pins 78 and 80 into the holes in the bottom hem of the back rest and further thereafter activated to stretch the seat back cover upwardly;

13) the tails 106 are brought into the bottom of the seat frame and secured to the seat frame elements;

14) the seat back stretchers are released by pressing button 58;

15) the seat cushion cover and back rest cover are steam heated as desired to remove wrinkles; and 16) the vertical compressor plate 28 is raised to permit the finished seating unit 12 to be removed from the pedestal 18.

The seating unit, when fitted with vinyl covers, may thereafter be sent to a curing oven to set the adhesive, if any, to unify the back rest cushion and to warm the vinyl covering to finally remove all wrinkles. The result is a well-fitted, attractive and securely assembled seating unit constructed with minimum physical wear and tear on the operator's arms and hands in that substantially all of the high stress, repetitive physical operations have been power-assisted.

Figure 6B:
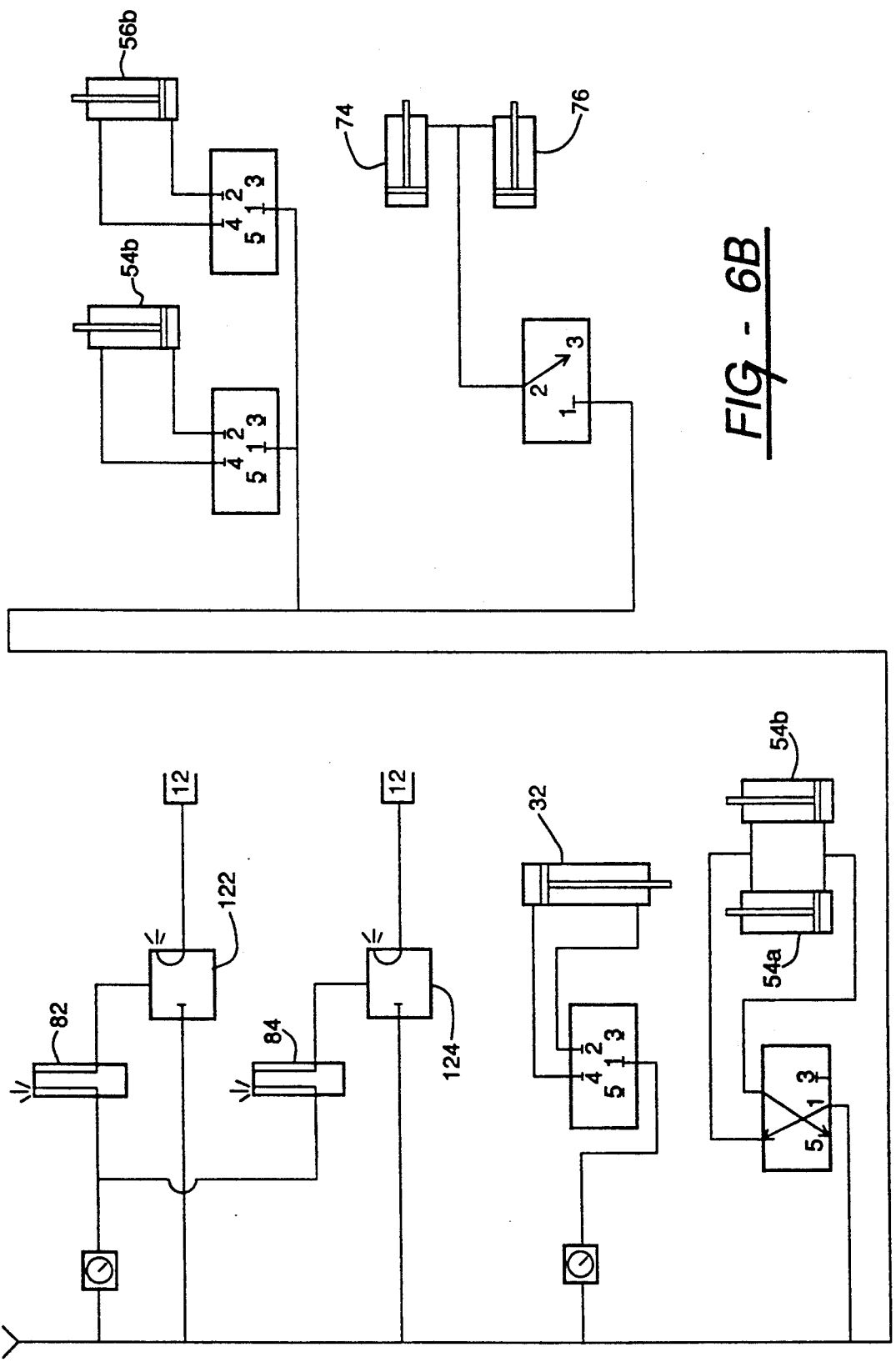

Referring now to FIG. 6, an electro-pneumatic circuit for the work station 10 of FIG. 1 will be described in detail. Air pressure is supplied to line 110 from any suitable air source; e.g., an air compressor and accumulator. Treadle 24 controls valve 112 to apply or block air to clutch 22 via valve 114. Jog circuits 114 may be provided for various air cylinders, in this case vertical compressor cylinder 32. Push button 58 controls circuit 58 to retract the cylinders 54 and 56. Additional jog circuits 116 and 118 may be provided to retract the stretcher cylinders 70,72. The push buttons 46 and 48 are connected to sequence controller 120. The handles 82 and 84 are connected to amplifier valves 122 and 124 as shown to detect the change in air pressure created when the worker places his thumbs over the holes on the handle ends and the power cylinders receive air for both forward (54a,56a) and retract (54b,56b) operation as shown. The circuit of FIG. 6 is illustrative of many control circuits which can be used. Suitable amplifier valves, 122 and 124, are available from Clippared Pneumatics, Model #2010.

We claim:

1. A seat assembly work station confrontable and operable by a seat assembly worker for the purpose of applying trim components to a previously partly assembled seating unit including a bottom cushion, said work station comprising:

a rotatable pedestal for receiving the seating unit in an inverted position;

means for selectively locking and releasing the pedestal for rotation so that the worker confronting the pedestal can place the seating unit in each of several angular orientations about an axis of rotation;

first compressor means for selectively compressing the bottom cushion against the pedestal, said first compressor means being rotatable about an axis which corresponds with the axis of rotation of the pedestal; and control means for activating the first compressor means.

2. Apparatus as defined in claim 1 wherein the first compressor means includes a first air cylinder, and a unitary support frame and means for mounting the first air cylinder on the support frame.

3. Apparatus as defined in claim 1, wherein the first compressor means moves through a path when activated by the control means and said control means comprises push button means arranged and located relative to the pedestal and first compressor means to be operative by a worker only in a position in which the worker is clear of the path of the compressor means.

4. Apparatus as defined in claim 3, wherein the push button means comprises a pair of spaced-apart push buttons and means requiring said buttons to be activated in sequence to enable operation of said first compressor means.

5. Apparatus as defined in claim 1, wherein the seating unit includes a metal frame and said first compressor means comprises an air cylinder having an extensible member which is extendable and retractable along a vertical path and a compressor plate adapted to engage the metal frame of a seating unit and compress the bottom cushion on said frame.

6. Apparatus as defined in claim 1 further including second compressor means operative to compress a seat back cushion of a seating unit on said pedestal.

7. A work station which is confrontable and operable by a seat assembly worker for the purpose of applying trim components to a previously partially assembled seating unit having a seat bottom portion and a seat back portion including a backrest cushion, said work station comprising:

a pedestal for receiving a partly assembled seating unit in an inverted position with the seat bottom portion positioned on the pedestal and the seat back portion extending downwardly from the pedestal;

means selectively operable by the worker confronting the pedestal to secure the seat bottom portion to the pedestal;

means operative with the seat bottom portion secured to the pedestal to compress at least a portion of the backrest cushion; and control means for selectively operating the means to compress.

8. Apparatus as defined in claim 7 wherein said means for securing the seat bottom portion to the pedestal is rotatable to permit the pedestal and the seating unit to rotate about an essentially vertical axis.

9. Apparatus as defined in claim 7 wherein said means to compress comprises at least one extensible fluid power cylinder and a padded compressor member connected to a extensible portion of said cylinder and engageable with the backrest cushion of the seating unit on said pedestal.

10. Apparatus as defined in claim 7 further including power assisted means for stretching a backrest trim cover over the backrest cushion of a seating unit secured to said pedestal.

11. A work station which is confrontable and operable by a worker for the purpose of applying trim components to a previously partially assembled seating unit having a seat frame and bottom and backrest cushions, said work station comprising:

a pedestal confronting the worker for receiving the seating unit in an inverted position with the bottom cushion positioned on the pedestal and the backrest cushion extending downwardly from the pedestal;

means for releasably securing the bottom cushion to the pedestal;

power-assist stretcher means engageable with a bottom edge of a backrest cover on the backrest cushion for stretching the cover toward the bottom cushion, thereby to the assist the worker in finalizing securement of the backrest cover to the seat frame; and control means selectively operable by the operator for extending and retracting the stretcher means.

12. Apparatus as defined in claim 11, wherein said pedestal and said means for releasably securing the bottom cushion to the pedestal are mutually rotatable about a common axis.

13. Apparatus as defined in claim 12, further including means for locking the pedestal in at least two angular positions about said axis of rotation.

14. A method assembling trim components to a previously partially assembled seating unit having a seat frame, a bottom cushion and a backrest cushion comprising the steps of:

a) applying a backrest cushion cover and a bottom cushion cover to the partially assembled unit;

b) placing the plurality assembled unit with the backrest and bottom cushion covers on a rotatable pedestal in an inverted orientation and a first angular position;

c) activating a first power means thereby compressing the bottom cushion against the pedestal and, simultaneously, securing the seating unit to the pedestal;

d) mechanically securing the bottom cushion cover to the seat frame;

e) rotating the pedestal with the seating unit secured thereto about a vertical axis to a second angular position;

f) compressing at least a portion of the backrest cushion while in the second position; and g) thereafter mechanically securing bottom edges of the backrest cushion cover to the seat frame.

15. A method as defined in claim 14 wherein step (g) comprises the additional substeps of engaging mechanical power-assisted stretching devices with the bottom edges of the backrest cushion cover and stretching the backrest cushion cover toward the bottom cushion.

* * * * *